(12) United States Patent
Kawamoto et al.

(10) Patent No.: US 10,258,822 B2
(45) Date of Patent: Apr. 16, 2019

(54) LAUNCHED BALL DETECTING APPARATUS AND LAUNCHED BALL DETECTING METHOD

(71) Applicant: GPRO Co., Ltd., Hyogo (JP)

(72) Inventors: Hideaki Kawamoto, Hyogo (JP); Viet Manh Do, Hanoi (VN); Hong Quan Luong, Hanoi (VN)

(73) Assignee: GPRO Co., Ltd., Hyogo (JP)

( * ) Notice: Subject to any disclaimer, the term of this patent is extended or adjusted under 35 U.S.C. 154(b) by 0 days.

(21) Appl. No.: 15/569,413

(22) PCT Filed: Nov. 28, 2016

(86) PCT No.: PCT/JP2016/085086
§ 371 (c)(1),
(2) Date: Oct. 26, 2017

(87) PCT Pub. No.: WO2017/163486
PCT Pub. Date: Sep. 28, 2017

(65) Prior Publication Data
US 2019/0046837 A1 Feb. 14, 2019

(30) Foreign Application Priority Data
Mar. 25, 2016 (JP) .................. 2016-061010

(51) Int. Cl.
*G01P 3/36* (2006.01)
*A63B 24/00* (2006.01)
(Continued)

(52) U.S. Cl.
CPC .......... *A63B 24/0021* (2013.01); *G01P 3/685* (2013.01); *G01P 13/00* (2013.01);
(Continued)

(58) Field of Classification Search
CPC .............. A63B 24/0021; A63B 220/30; A63B 2024/0034; G01P 3/685; G01P 13/00; G06K 9/00724
(Continued)

(56) References Cited

U.S. PATENT DOCUMENTS

| 2001/0023209 A1* | 9/2001 | Yamamoto ......... A63B 24/0021 473/407 |
| 2008/0153613 A1* | 6/2008 | Choi .................. A63B 24/0021 473/156 |

(Continued)

FOREIGN PATENT DOCUMENTS

| JP | 7159117 | 6/1996 |
| JP | 11206942 | 8/1999 |

(Continued)

*Primary Examiner* — Mark Hellner
(74) *Attorney, Agent, or Firm* — Renner, Otto, Boisselle & Sklar, LLP

(57) ABSTRACT

The ball existence determining part 301 determines a specific infrared zone where the stopped ball exists as a ball existing zone in plural infrared zones. The first object appearance determining part 302 determines the front and end infrared zones being adjacent the ball existing zone as front and end object appearance schedule zones, and determines whether or not the object for launching the ball appeared in either one of the front and end object appearance schedule zones. The second object appearance determining part 303 determines whether or not the object appeared in the remaining object appearance schedule zone when the object appeared in either one of the front and end object appearance schedule zones. The ball disappearance determining part 304 determines whether or not the ball in the ball existing zone disappeared when the object appeared in the remaining object appearance schedule zone. The ball launch detecting part 305 detects that the ball was launched (Continued)

by the object when the ball in the ball existing zone disappeared, and transmits a trigger signal.

5 Claims, 5 Drawing Sheets

(51) Int. Cl.
*G01P 3/68* (2006.01)
*G06K 9/00* (2006.01)
*G01P 13/00* (2006.01)

(52) U.S. Cl.
CPC .. *G06K 9/00724* (2013.01); *A63B 2024/0034* (2013.01); *A63B 2220/30* (2013.01)

(58) Field of Classification Search
USPC .......................................................... 356/28
See application file for complete search history.

(56) References Cited

U.S. PATENT DOCUMENTS

| | | | |
|---|---|---|---|
| 2008/0204704 A1* | 8/2008 | Rankin | A63B 24/0021 |
| | | | 356/28 |
| 2014/0118720 A1* | 5/2014 | Steffl | G01P 3/685 |
| | | | 356/28 |
| 2017/0336509 A1* | 11/2017 | Davis | G01S 17/46 |

FOREIGN PATENT DOCUMENTS

| | | |
|---|---|---|
| JP | 2002315858 | 10/2002 |
| JP | 2003000786 | 1/2003 |
| JP | 2005529339 | 9/2005 |
| JP | 2014500078 | 1/2014 |

* cited by examiner

[Fig. 1]
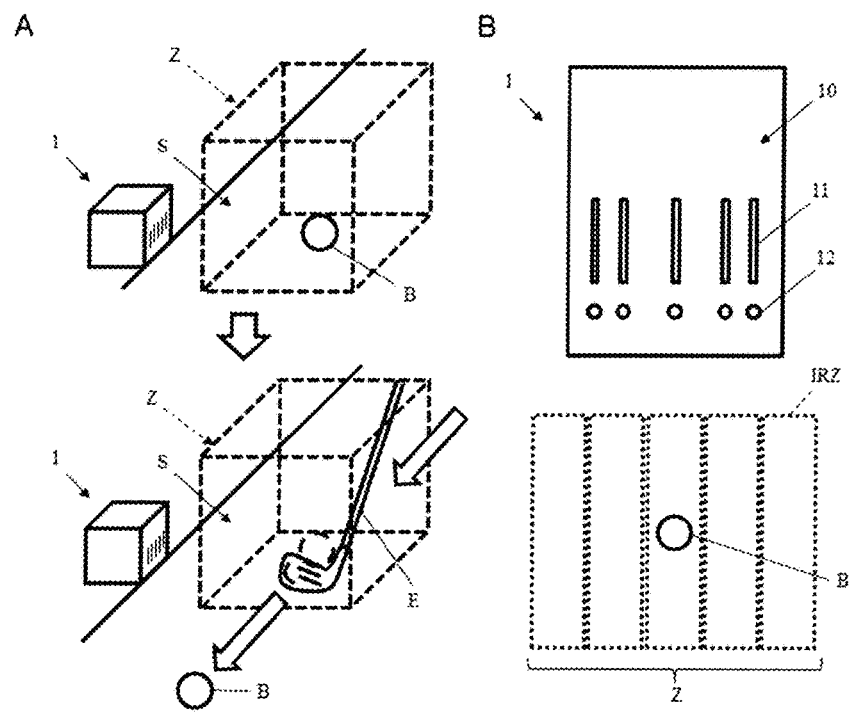
[Fig. 2]
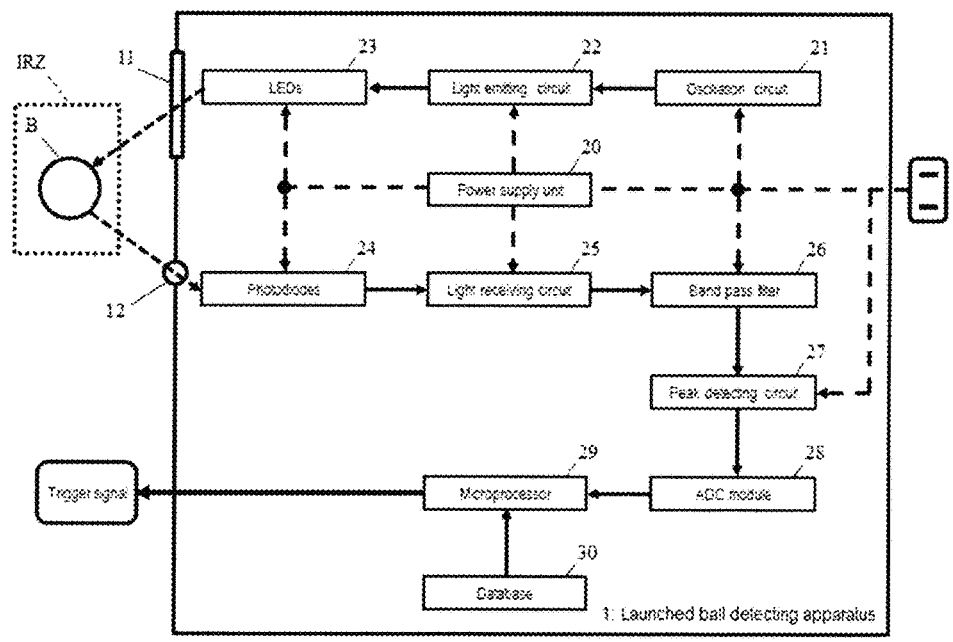

[Fig. 3]
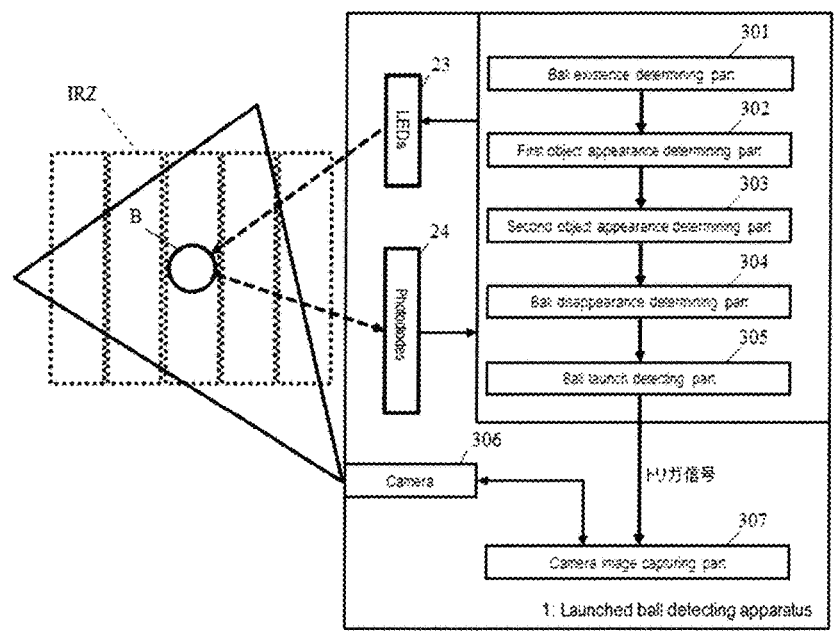
[Fig. 4]
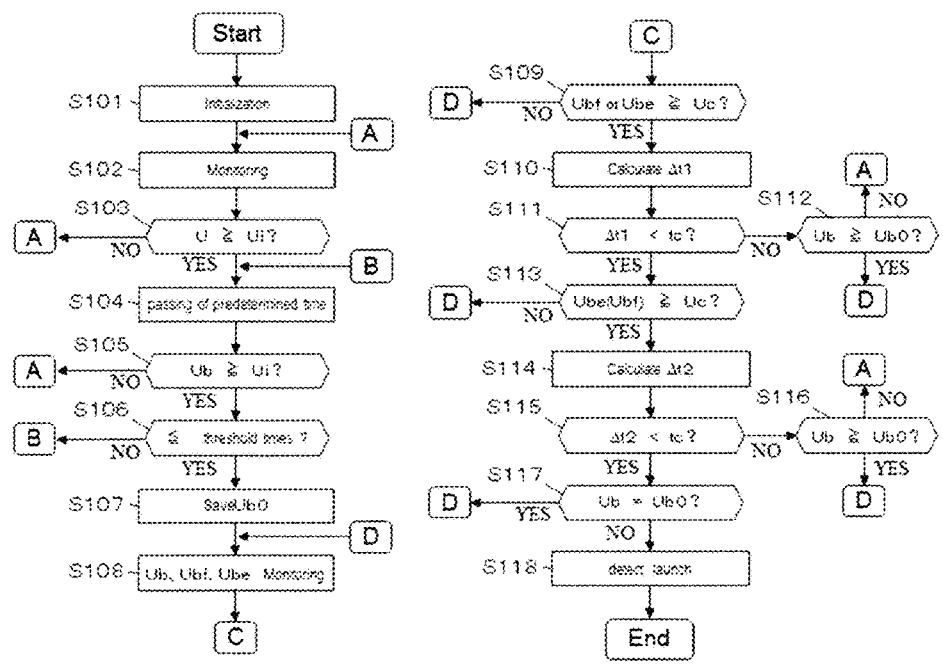

[Fig. 5]
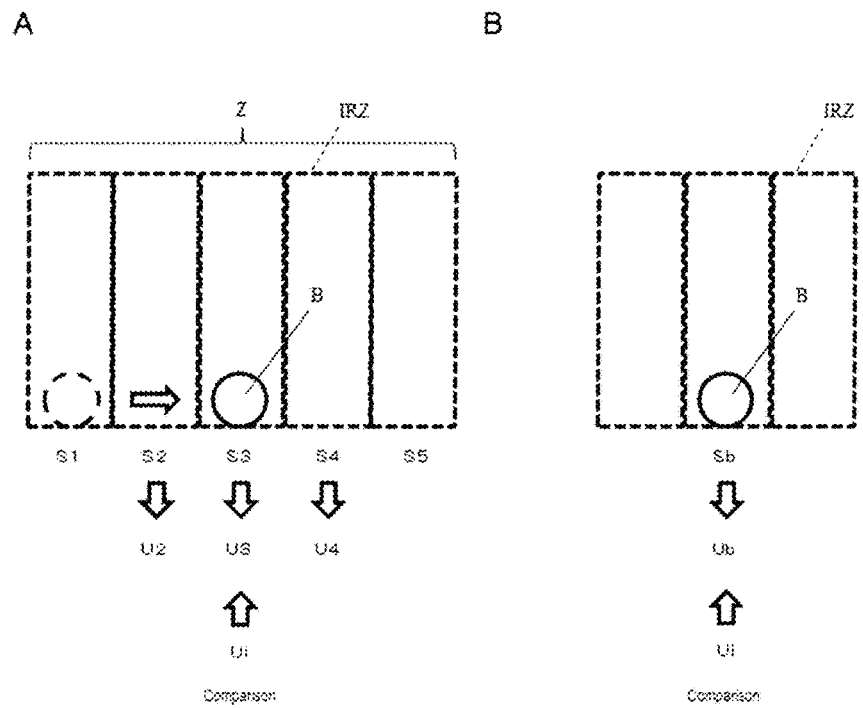
[Fig. 6]
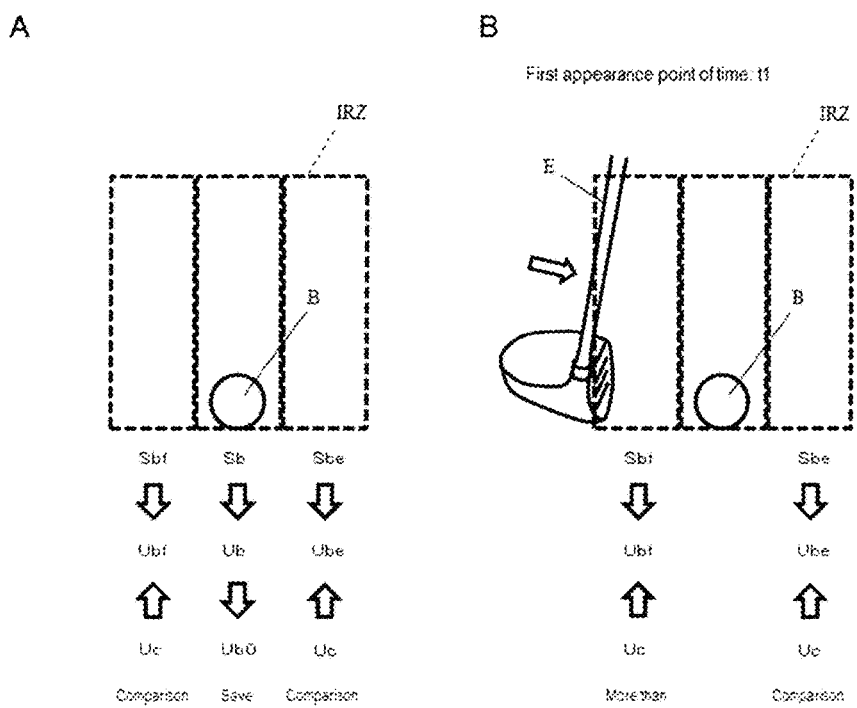

[Fig. 7]
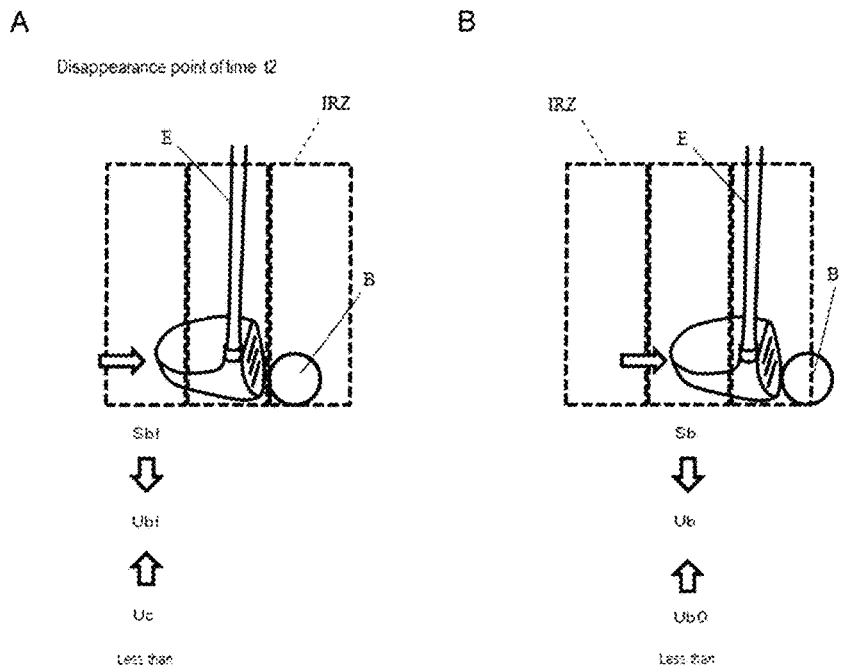
[Fig. 8]
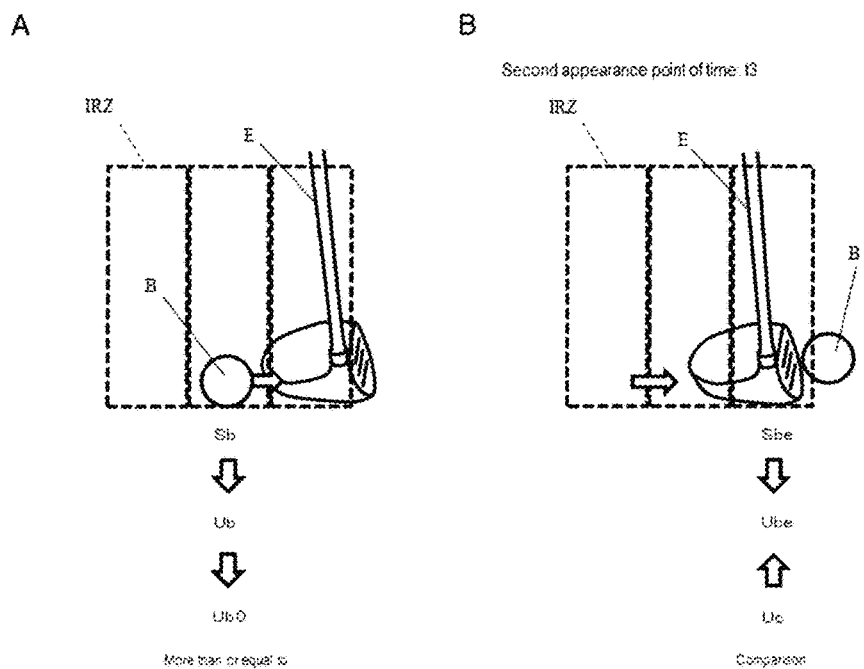

[Fig. 9]
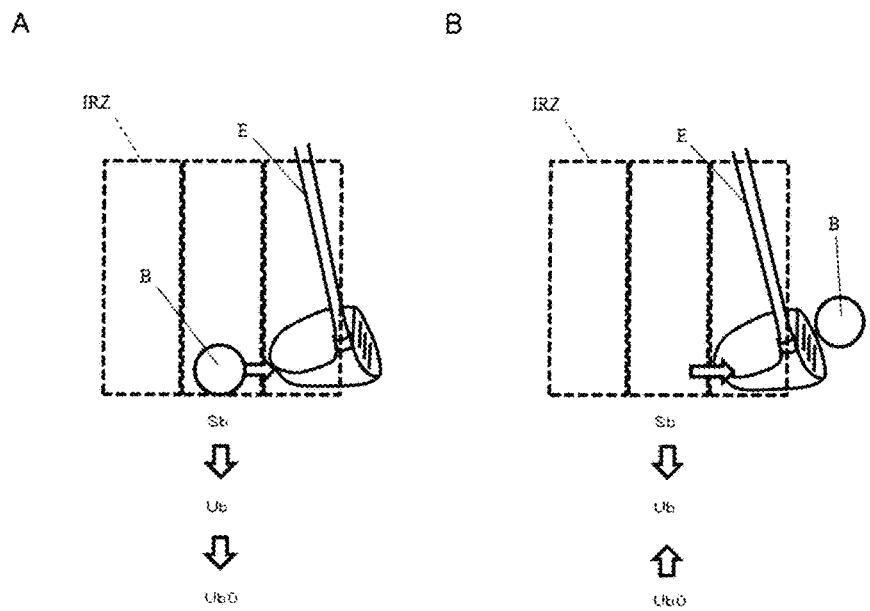
[Fig. 10]
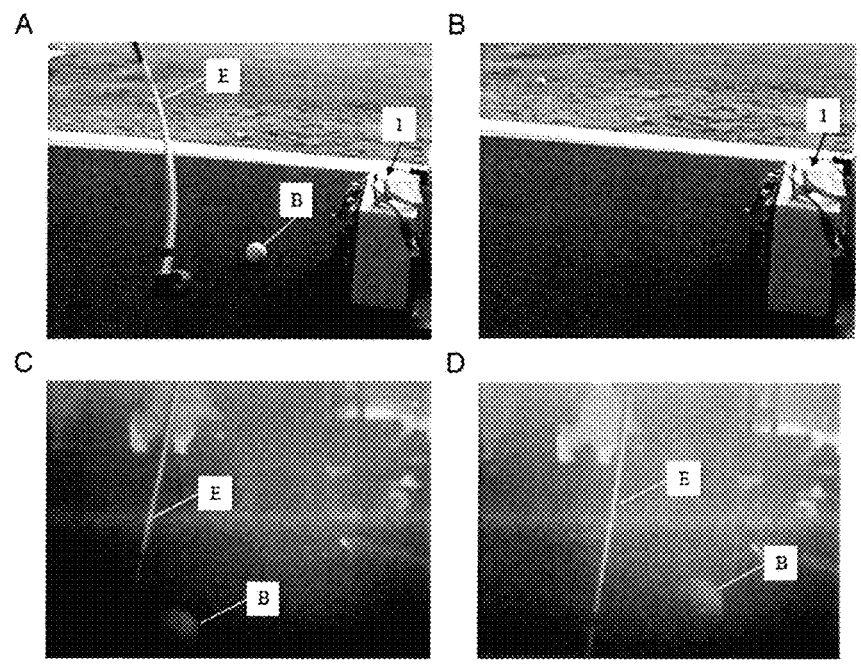

LAUNCHED BALL DETECTING APPARATUS AND LAUNCHED BALL DETECTING METHOD

This application is a national phase of International Application No. PCT/JP2016/085086 filed Nov. 28, 2016, which claims priority to Japanese Patent Application No. 2015-061010 filed Mar. 25, 2016 in the Japan Patent Office, which are hereby incorporated herein by reference.

TECHNICAL FIELD

The present invention relates to a launched ball detecting apparatus and a launched ball detecting method.

BACKGROUND ART

Traditionally, techniques for measuring the flight parameters of the ball, such as a golf ball exist a lot. For example, Patent Literature 1, Patent Literature 2, Patent Literature 3, Patent Literature 4, Patent Literature 5, and Patent Literature 6 disclose a flight parameter measurement system.

CITATION LIST

Patent Literature

Patent Literature 1
  Japanese Unexamined Patent Application Publication (Translation of PCT Application) No. 2014-500078
Patent Literature 2
  Japanese Unexamined Patent Application Publication No. 2002-315858
Patent Literature 3
  Japanese Unexamined Patent Application Publication No. 2003-786
Patent Literature 4
  Japanese Unexamined Patent Application Publication No. 2005-529339
Patent Literature 5
  Japanese Unexamined Patent Application Publication No. Hei 7-159117
Patent Literature 6
  Japanese Unexamined Patent Application Publication No. Hei 11-206942

SUMMARY OF INVENTION

Technical Problem

However, in prior art, a detecting zone (area) is provided ahead of a stopping ball, when the ball passes through the detecting zone, the measurement of the flight parameters of the ball starts. Thus, it is a premise that a detecting apparatus forming the detective zone exists ahead of the ball. By constructing this way, for example, when a player launches (shoots) the ball, the ball may collide with the detective apparatus without passing through the detective zone, and it is a problem that the detective apparatus is damaged.

On the other hand, when measuring the flight parameters of the ball, a launch speed of the ball, a launch elevational angle, a launch horizontal angle, etc., are important, even though the moving distance of the ball, etc., are calculated by using the launch speed of the ball after launched, it is a problem that the error is easy to occur. Therefore, it is preferable that the moment when the ball launched is detected directly.

Accordingly, the present invention was created as a solution for the problems and aims at providing a launched ball detecting apparatus and a launched ball detecting method that can detect the launch of the ball accurately.

Solution to Problem

After conducting rigorous and repeated research, the present inventors have completed a novel launched ball detecting apparatus and a novel launched ball detecting method. Namely, the launched ball detecting apparatus comprises a ball existence determining part, a first object appearance determining part, a second object appearance determining part, a ball disappearance determining part, and a ball launch detecting part. The ball existence determining part determines a specific infrared zone where the stopped ball exists as a ball existing zone in plural infrared zones, the infrared zone irradiated with the infrared light, based on the intensity of the reflected light in the respective plural infrared zones being adjacent one another. The first object appearance determining part determines the front and end infrared zones being adjacent the ball existing zone as front and end object appearance schedule zones when the ball existing zone is determined, and determines whether or not the object for launching the ball appeared in either one of the front and end object appearance schedule zones, based on the intensity of the reflected light in the respective front and end object appearance schedule zones. The second object appearance determining part determines whether or not the object appeared in the remaining object appearance schedule zone other than the object appearance zone where the object appeared, based on the intensity of the reflected light in the remaining object appearance schedule zone when the object appeared in either one of the front and end object appearance schedule zones. The ball disappearance determining part determines whether or not the ball in the ball existing zone disappeared, based on the reflected light in the ball existing zone when the object appeared in the remaining object appearance schedule zone. The ball launch detecting part detects that the ball was launched by the object when the ball in the ball existing zone disappeared, and transmits a trigger signal.

The launched ball detecting method comprises a ball existence determining step, a first object appearance determining step, a second object appearance determining step, a ball disappearance determining step, and a ball launch detecting step. The ball existence determining step determines a specific infrared zone where the stopped ball exists as a ball existing zone in plural infrared zones, the infrared zone irradiated with the infrared light, based on the intensity of the reflected light in the respective plural infrared zones being adjacent one another. The first object appearance determining step determines the front and end infrared zones being adjacent the ball existing zone as front and end object appearance schedule zones when the ball existing zone is determined, and determines whether or not the object for launching the ball appeared in either one of the front and end object appearance schedule zones, based on the intensity of the reflected light in the respective front and end object appearance schedule zones. The second object appearance determining step determines whether or not the object appeared in the remaining object appearance schedule zone other than the object appearance zone where the object appeared, based on the intensity of the reflected light in the remaining object appearance schedule zone when the object appeared in either one of the front and end object appearance schedule zones. The ball disappearance determining step determines whether or not the ball in the ball existing zone disappeared, based on the reflected light in the ball existing zone when the object appeared in the remaining object appearance schedule zone. The ball launch detecting step detects that the ball was launched by the object when the ball in the ball existing zone disappeared, and transmits a trigger signal.

Advantageous Effects of Invention

According to the present invention, the present invention can detect the launch of the ball accurately.

BRIEF DESCRIPTION OF DRAWINGS

FIG. 1A is the outline diagram indicating the apparatus for detecting the launched ball according to the invention.

FIG. 1B is the outline diagram indicating detective zones of the apparatus for detecting the launched ball according to the invention.

FIG. 2 is the outline block diagram indicating the apparatus for detecting the launched ball according to the invention.

FIG. 3 is the functional block diagram indicating the apparatus for detecting the launched ball according to the invention.

FIG. 4 is the flowchart indicating execution steps of the apparatus for detecting the launched ball according to the invention.

FIG. 5A is the outline diagram when a ball is put at an infrared zone in plural infrared zones.

FIG. 5B is the outline diagram when a ball stops at the infrared zone in plural infrared zones.

FIG. 6A is the outline diagram before an object appears in the infrared zone in plural infrared zones.

FIG. 6B is the outline diagram when the object appeared in the infrared zone in plural infrared zones.

FIG. 7A is the outline diagram when the object collided with the ball.

FIG. 7B is the outline diagram when the object moves slowly and strikes the ball.

FIG. 8A is the outline diagram when the object moves slowly and did not strike the ball.

FIG. 8B is the outline diagram when the object collided with the ball.

FIG. 9A is the outline diagram when the object moved fast and did not strike the ball.

FIG. 9B is the outline diagram when the object moved fast, collided with the ball, and made the ball launched.

FIG. 10A is the photograph when the player hits the ball by the golf club in the golf practice range in example.

FIG. 10B is the photograph when the player hit the ball by the golf club in the golf practice range in example.

FIG. 10C is the camera image at the moment when the golf club hits the ball.

FIG. 10D is the camera image at the moment when the ball hit by the golf club launched.

DESCRIPTION OF EMBODIMENTS

The preferred embodiments of a launched ball detecting apparatus and a launched ball detecting method in the present invention will be explained below according to the attached drawings; thereby the present invention will be clearly understood. The embodiments below are examples materializing the present invention, and do not limit the technical scope of the present invention.

As shown in FIG. 1A, a launched ball detecting apparatus 1 in the present invention is placed on a flat plane S, and forms a detecting zone Z in response to the turn-on of the power supply. The detecting zone Z is formed in approximately rectangular parallelepiped shape in the front vicinity of the launched ball detecting apparatus 1. When the ball B is placed in the detecting zone Z and stands still, the launched ball detecting apparatus 1 detects that the ball B stands still based on the change of the intensity of the reflected light in the detecting zone Z. When the ball B is launched by a launching equipment E such as a golf club, the launched ball detecting apparatus 1 detects that the ball B is launched based on the change of the intensity of the reflected light in the detecting zone Z. In this way, it is unnecessary to place the launched ball detecting apparatus 1 in front of the ball B in the present invention, and when the ball B is placed in the just beside of the launched ball detecting apparatus 1 at a right angle direction to a launching direction of the ball B, it is possible to directly detect the moment when the ball B is launched.

The forming method of the detecting zone Z is not particularly limited. For example, as shown in FIG. 1B, the launched ball detecting apparatus 1 has plural rectangular slits 11 to an exterior 10, a LED (Light-emitting element) using the infrared light as a light source is provided in the inside of the slit 11, and the infrared light emitted by the LED passes through the slits 11 and forms the infrared zone IRZ of the rectangular shape. Here, five slits 11 are provided. The plural infrared zones IRZ respectively formed at the respective slits 11 are adjacent, become a approximately rectangular parallelepiped shape as a whole, and comprise the detecting zone Z. Although the size of the infrared zone IRZ is appropriately set, for example, the size of the light emission direction of the LED is 40 cm, and the size of the right angle direction to the light emission direction of the LED is 8 cm. The size of the infrared zone IRZ is set so that the ball B exists only in either one infrared zone IRZ in plural infrared zones IRZ when the ball B is placed on the detecting zone Z. The launched ball detecting apparatus 1 has plural holes 12 respectively formed just below the respective slits 11, a photodiode (light receiving element) receiving the reflected light of the infrared light is provided in the inside of the hole 12, and when the ball B is placed on either one infrared zone IRZ, the intensity of the reflected light in the infrared zone IRZ changes by the existence of the ball B. By the photodiode detecting the change through the hole 12, it is possible to determine whether or not the ball B exists in either infrared zone IRZ in plural infrared zones IRZ.

Next, the constitution of the launched ball detecting apparatus 1 in the present invention is explained. As shown in FIG. 2, the launched ball detecting apparatus 1 in the present invention comprises a power supply unit 20, an oscillation circuit 21, a light emitting circuit 22, LEDs 23, photodiodes 24, a light receiving circuit 25, a band pass filter 26, a peak detecting circuit 27, an ADC (Analog To Digital Conversion) module 28, a microprocessor 29, and a database 30. The power supply unit 20 supplies electric power to each unit.

The oscillation circuit 21, the light emitting circuit 22, and LEDs 23 are responsible for the light emitting module of the launched ball detecting apparatus 1. The oscillation circuit 21 oscillates a vibrational electrical signal periodically. The vibrational electrical signal comprises a square wave and a sine wave, and is Pulse-width modulation signal (PWM: Pulse Width Modulation). For example, the oscillation circuit 21 oscillates the square wave, the period of the square wave being low period of the specific value (e.g., 10 kHz), and inputs the square wave to the light emitting circuit 22. By setting the period to low period, it is possible to avoid the natural noise signal of high period (low frequency) based on the disturbance such as the outdoor sun light or the indoor ceiling light. The light emitting circuit 22 controls the light emitting of the LED 23 based on the input vibrational electrical signal. The LED 23 irradiates infrared light towards the slit 11, based on the control of the light emitting circuit 22. In this way, the infrared zone IRZ is formed.

The photodiodes 24, the light receiving circuit 25, the band pass filter 26, and the peak detecting circuit 27 are responsible for the light receiving module of the launched ball detecting apparatus 1. The photodiode 24 converts the reflected light reflected from the infrared zone IRZ through the hole 12 into a current signal, and inputs the current signal to the light receiving circuit 25. Here, the intensity of the reflected light is changed by the existence of the ball B in the infrared zone IRZ. The light receiving circuit 25 converts the input current signal into a voltage signal, and inputs the voltage signal to the band pass filter 26. The band pass filter 26 only passes the voltage signal in a period of a specific range in the input voltage signal and does not pass the voltage signal in a period out of the range. The center of the range is a specific value (ex: 10 kHz). In this way, it is possible to prevent from malfunctioning due to the above disturbance surely. The band pass filter 26 inputs the passed voltage signal to the peak detecting circuit 27. The peak detecting circuit 27 detects the peak value from the input voltage signal, and inputs the peak value to the ADC module 28.

Here, when the light emitting module and the light receiving module are provided at the respective slits 11 and the respective holes 12, by monitoring the change of the intensity of the reflected light in the respective infrared zones IRZ, it is possible to detect the infrared zone IRZ (position) where the ball B exists.

The ADC module 28, the microprocessor 29, and the database 30 are responsible for the detecting module of the launched ball detecting apparatus 1. The ADC module 28 converts the input peak value into a digital value, and inputs the digital value to the microprocessor 29. The microprocessor 29 monitors the input digital value, compares the digital value with a sample value of the database 30, and outputs a trigger signal by the below execution procedure. The launch of the ball B is detected by the output of the trigger signal.

The microprocessor 29 builds CPU, ROM, RAM, and the like no shown, and for example, CPU uses RAM as a working area and executes program stored in ROM and the like. About the below respective parts, CPU executes the program for materializing the respective parts.

As referring to FIG. 3, FIG. 4, the constitution and the execution steps in the embodiment of the present invention are explained. First, when the user (player) turns on the power supply of the launched ball detecting apparatus 1, the launched ball detecting apparatus 1 goes to the first state, and the ball existence determining part 301 of the launched ball detecting apparatus 1 executes an initialization process (FIG. 4, S101). For example, the temporarily stored value is erased and the default value of the database 30 is acquired.

Further, the launched ball detecting apparatus 1 proceeds the second state, the ball existence determining part 301 determines a specific infrared zone IRZ where the stopped ball B exists as a ball existing zone in plural infrared zones IRZ, the infrared zone IRZ irradiated with the infrared light, based on the intensity U of the reflected light in the respective plural infrared zones IRZ being adjacent one another.

The determining method is not particularly limited. For example, the ball existence determining part 301 emits a specific LED 23 at a specific period, receives the reflected light from the infrared zone IRZ at a photodiode 24 in response to the LED 23, and acquires the intensity U of the reflected light in the infrared zone IRZ. The ball existence determining part 301 emits plural LEDs 23 in order, receives the reflected light at respective photodiodes 24, and as shown in FIG. 5A, monitors (scan) the intensity U of the reflected light from one end of the infrared zones IRZ to the other end of the infrared zones IRZ (FIG. 4, S102).

Here, it is unnecessary to monitor the intensity U of the reflected light in all of the infrared zones IRZ. For example, if the five existing infrared zones IRZ are called S1, S2 , , , S5 in order from one end to the other end, the ball existence determining part 301 may select the center of S3 of the infrared zone IRZ in plural infrared zones IRZ, include the center of the infrared zone IRZ (S3) and the front and end the infrared zones IRZ (S2,S4), and monitor the intensity U2, U3, U4 of the reflected light corresponding to the predetermined number of the infrared zones IRZ (S2, S3, S4). In order to acquire the intensity U of the reflected light in a specific infrared zone IRZ, since the predetermined time (for example, 1.5 sec-6.0 sec) is taken, so the monitoring speed form acquiring the intensity U of the reflected light in one of the infrared zone IRZ to acquiring the intensity U of the reflected light in the next infrared zone IRZ is set to be lower such as the period 0.5 Hz-2.0 Hz.

Next, the ball existence determining part 301 compares the intensity U of the reflected light in the respective monitored infrared zones IRZ with a ball threshold Ui preliminarily stored in the database 30, and determines whether or not the intensity U of the reflected light is more than or equal to the ball threshold Ui for the respective infrared zones IRZ (FIG. 4, S103).

Here, the ball threshold Ui is a value that the manufacturer preset based on the intensity of the reflected light acquired when the ball B exists in the infrared zone IRZ and the intensity of the reflected light acquired when the ball B does not exist in the infrared zone IRZ, and is appropriately designed according to the type and size of the ball.

As the result of the determination, when the intensity U of the reflected light in all of infrared zones IRZ are less than the ball threshold Ui (FIG. 4, S103NO), in this case, it means that the ball B does not exist in all of infrared zones IRZ, so the ball existence determining part 301 goes to S102 after the predetermined time (for example, 0.5 sec) passes, and repeat the monitoring.

On the other hand, in S103, as the result of the determination, when the intensity U of the reflected light in a specific infrared zone IRZ (for example, S3) is more than or equal to the ball threshold Ui (FIG. 4, S103YES), in this case, it means that user placed the ball B in the specific infrared zone IRZ (for example, S3). Therefore, the ball existence determining part 301 determines the specific infrared zone IRZ as a ball existing zone Sb, and the launched ball detecting apparatus 1 proceeds the next third state.

Here, in the third state, the ball existence determining part 301 determines whether or not the ball B in the ball existing zone Sb stops.

The determining method is not particularly limited. For example, the ball existence determining part 301 limits the monitoring object of the intensity U of the reflected light to the ball existing zone Sb, and goes the LEDs 23 in the other infrared zone IRZ to the idle state of the low power consumption mode. Next, the ball existence determining part 301 counts the passing times as one time, and waits for the passing of the predetermined time (for example, 0.5 sec) (FIG. 4, S104). Then, after the predetermined time passes, as shown in FIG. 5B, the ball existence determining part 301 acquires the intensity Ub of the reflected light in the ball existing zone Sb again, and determines whether or not the intensity Ub is more than or equal to the ball threshold Ui (FIG. 4, S105).

As the result of the determination, when the intensity Ub is less than the ball threshold Ui (FIG. 4, S105NO), in the case, it means that after the predetermined time passes, the ball B moves and is lost from the ball existing zone Sb. Therefore, the ball existence determining part 301 goes to S102, and restarts from the determination of the ball existing zone Sb.

On the other hand, as the result of the determination, when the intensity Ub is more than or equal to the ball threshold Ui (FIG. 4, S105YES), in the case, it is possibility that the ball B stops in the ball existing zone Sb. Therefore, next, the ball existence determining part 301 determines whether or not the passing times ("one time"), counted some time ago is more than or equal to a threshold times (for example, six times) preliminarily stored in the database 30 (FIG. 4, S106).

As the result of the determination, when the passing times is less than the threshold times (FIG. 4, S106NO), in the case, a sufficient times did not pass from the moment when the ball B stops in the ball existing zone Sb, so the ball existence determining part 301 goes to S104, adds one time to the passing times, counts the passing times as two times, and waits for the passing of the predetermined time (FIG. 4, S104). In this way, by repeating the determining that the intensity Ub of the reflected light in the ball existing zone Sb is more than or equal to the ball threshold Ui, it is possible to surely detect that the ball B stops in the ball existing zone Sb for the predetermined time. In addition, the predetermined time is appropriately set by the threshold times, and is 3 sec-5 sec, for example. If the parallel device like FPGA is used, the predetermined time can be reduced such as 2 sec-3 sec.

The determination of S105YES repeats, in S106, as the result of the determination, when the passing times is more than or equal to the threshold times (FIG. 4, S106YES), in the case, it is estimated that the ball B completely stops in the ball existing zone Sb. Therefore, the ball existence determining pan 301 determines that the ball B stops in the ball existing zone Sb, and the launched ball detecting apparatus 1 proceeds the next fourth state.

In addition, the third state is a process for accurately determining the ball existing zone Sb, unless particularly necessary, the third state may be omitted.

In the fourth state, a first object appearance determining part 302 temporarily saves the intensity Ub of the reflected light in the ball existing zone Sb into the predetermined memory as a determining value Ub0 (FIG. 4, S107).

Next, the first object appearance determining part 302 determines the front and end infrared zones IRZ being adjacent the ball existing zone Sb as a front and end object appearance schedule zones Sbf, Sbe when the ball existing zone Sb is determined, and determines whether or not the object for launching the ball B appeared in either one of the front and end object appearance schedule zones. Sbf, Sbe, based on the intensity Ubf, Ube of the reflected light in the respective front and end object appearance schedule zones Sbf, Sbe.

The determining method is not particularly limited. For example, the first object appearance determining part 302 selects the front and end infrared zones IRZ (S2, S4) for the ball existing zone Sb (for example, S3), determines the first order infrared zone IRZ (S2) the front object appearance schedule zone Sbf and determines the end order infrared zone IRZ (S4) the end object appearance schedule zone Sbe. Next, as shown in FIG. 6A, the first object appearance determining part 302 monitors the intensity Ubf, Ub, Ube of the respective reflected light in order of the front object appearance schedule zone Sbf, the ball existing zone Sb, the end object appearance schedule zones Sbe (FIG. 4, S108). In this way, by limiting the monitoring object, it is unnecessary to acquire the useless intensity of the reflected light.

Here, the monitoring speed is set corresponding to the launch speed that the ball B launches. For example, the maximum launch distance of the moment when the golf ball B launches by the golf club is considered 2.0 cm in 250 usec, and the maximum launch speed of the golf ball B can be converted with 210 mph. For the maximum launch speed, in order to secure the sampling times of the intensity Ubf, Ub, Ube of the reflected light 5 times-10 times, for example, the monitoring speed from acquiring the intensity U of one reflected light to acquiring the intensity U of next reflected light is set to be higher such as the period 20 Hz-40 Hz.

Then, the first object appearance determining part 302 determines whether or not the intensity Ubf of the reflected light in the front object appearance schedule zone Sbf or the intensity Ube of the reflected light in the end object appearance schedule zone Sbe is more than or equal to an object threshold Uc preliminarily stored in the database 30 (FIG. 4, S109).

Here, the object threshold Uc is a value that the manufacturer preset based on the intensity of the reflected light acquired when the object exists in the infrared zone IRZ and the intensity of the reflected light acquired when the object does not exist in the infrared zone IRZ, and is appropriately designed according to the type of the ball B launching and detected. For example, if the ball is a golf ball, the object becomes a golf club, if the ball is a baseball, the object becomes a bat, if the ball is a tennis ball, the object becomes a racket, if the ball is a soccer ball, the object becomes the legs of a player, if the ball is a pack of ice hockey, the object becomes a stick.

As the result of the determination, when any of the intensity Ubf of the reflected light in the front object appearance schedule zone Sbf and the intensity Ube of the reflected light in the end object appearance schedule zone Sbe are less than the object threshold Uc (FIG. 4, S109NO), in the case, it means that the object does not still appear toward the ball B (the launch of the ball B does not start). Therefore, the first object appearance determining part 302 goes to S108 after the predetermined time (for example, 250 usec) passes, and repeats the monitoring.

On the other hand, as the result of the determination, when either one of the intensity Ubf of the reflected light in the front object appearance schedule zone Sbf or the intensity Ube of the reflected light in the end object appearance schedule zone Sbe is more than or equal to the object threshold Uc (FIG. 4, S109YES), for example, as shown in FIG. 6B, when the player swings toward the ball B with the golf club E and the golf club E enters to the front object appearance schedule zone Sbf as a object, the intensity Ubf of the reflected light in the front object appearance schedule zone Sbf is more than or equal to the object threshold Uc. In the case, it means that the object E appears toward the ball B (the launch of the ball B starts), then the first object appearance determining part 302 determines that the object E appears in either one of the front and end object appearance schedule zones Sbf, Sbe.

Here, in order to accurately detect that the appearing object is a object for launching the ball B, the following processing may be performed. Namely, the first object appearance determining part 302 determines whether or not the first appearance time Δt1 from the appearance of the object to the disappearance of the object in the object appearance zone Sbf where the object appeared is less than a threshold time tc (for example, 250 usec) preliminarily stored in the database 30.

The determining method is not particularly limited. For example, when the intensity Ubf (Ube) of the reflected light in the specific object appearance schedule zone Sbf (Sbe) is more than or equal to the object threshold Uc, the first object appearance determining part 302 starts to count the passing time from the first appearance point of time t1. Next, the first object appearance determining part 302 monitors the intensity Ubf of the reflected light in the object appearance zone Sbf where the object E appeared, and determines whether or not the intensity Ubf of the reflected light in the object appearance zone Sbf is less than the object threshold Uc. So the object E appears toward the ball B, as shown in FIG. 7A, the object E collides with the ball B, and the object E and the ball B disappear from the object appearance zone Sbf. Then, the object appearance determining part 302 determines that the intensity Ubf of the reflected light in the object appearance zone Sbf is less than the object threshold Uc, uses the disappearance point of time t2, and calculates the first appearance time Δt1 subtracting the first appearance point of time t1 from the disappearance point of time t2 (FIG. 4, S110). In addition, the passing time from the disappearance point of time t2 is continued to count. The first object appearance determining part 302 determines whether or not the first appearance time Δt1 is less than the threshold time tc (FIG. 4, S111).

Here, the threshold time tc is appropriately set corresponding to the type of the ball B launching and detected. For example, if the ball is a golf ball, the maximum launch speed of the golf ball B can be rough estimated to 210 mph, when the time (for example, 250 usec) of the object E (golf club) interrupting the object appearance zone Sbf is set to be the first appearance time, it is possible to accurately detect that the golf ball B is launched by the golf club E. In addition, the threshold time tc may be appropriately set according to the ball game such as baseball, tennis, soccer, etc.

As the result of the determination, when the first appearance time Δt1 is more than or equal to the threshold time tc (FIG. 4, S11NO), in the case, it means that the movement of the object E is slow and it is uncertain whether or not the object E hits the ball B. For example, it is assumed that the golf club E slowly interrupts the object appearance zone Sbf. Therefore, the first object appearance determining part 302 newly acquires the intensity Ub of the reflected light in the ball existing zone Sb, and determines whether or not the intensity Ub of the reflected light is more than or equal to the determining value Ub0 (FIG. 4, S112). Here, by using the determining value Ub0, it is possible to accurately detect the existence of the ball B in the ball existing zone Sb.

As the result of the determination, when the intensity Ub of the reflected light in the ball existing zone Sb is less than the determining value Ub0 (FIG. 4, S112NO), in the case, as shown in FIG. 7B, it means that the player slowly moves the golf club E and shifts the position of the golf ball B. Therefore, the first object appearance determining part 302 stops counting the passing time from the disappearance point of time t2, goes to S102, and restarts all processing.

On the other hand, as the result of the determination, when the intensity Ub of the reflected light in the ball existing zone Sb is more than or equal to the determining value Ub0 (FIG. 4, S112YES), in the case as shown in FIG. 8A, it means that the player slowly swings the golf club E and the golf ball B still remains. Therefore, the first object appearance determining part 302 stops counting the passing time from the disappearance point of time t2, goes to S108, and restarts from the determination of the appearing object.

By the way, in S111, as the result of the determination, when the first appearance time Δt1 is less than the threshold time tc (FIG. 4, S111YES), in the case, it means that the movement of the object E is fast and the possibility that the object E hits the ball B is high. Therefore, the first object appearance determining part 302 determines that the object E appears in order to hit the ball B.

Next, a second object appearance determining part 303 determines whether or not the object appeared in the remaining object appearance schedule zone Sbe other than the object appearance zone Sbf where the object E appeared, based on the intensity of the reflected light in the remaining object appearance schedule zone Sbe.

The determining method is not particularly limited. For example, the second object appearance determining part 303 selects the object appearance schedule zone Sbe other than the object appearance zone Sbf where the object E appeared firstly in the front and end object appearance schedule zone Sbf, Sbe, and acquires the intensity Ube of the reflected light in the selecting object appearance schedule zone Sbe. Next, the second object appearance determining part 303 determines whether or not the intensity Ube of the reflected light in the remaining object appearance schedule zone Sbe is more than or equal to the object threshold Uc (FIG. 4, S113). Here, as mentioned above, since the front object appearance schedule zone Sbf becomes the object appearance schedule zone, the end object appearance schedule zone Sbe becomes the determined target. Also, by using the object threshold Uc, it is possible to equalize the detection accuracy of the appearance of the object E.

As the result of the determination, when the intensity Ube of the reflected light in the remaining object appearance schedule zone Sbe is less than the object threshold Uc (FIG. 4, S113NO), in the case, the possibility that the golf ball B is not launched by the player stopping the golf club E at the ball existence zone Sb is high. Therefore, the second object appearance determining part 303 stops counting the passing time from the disappearance point of time t2 after the predetermined time (for example, 250 usec) passes, goes to S108, and repeats the monitoring.

On the other hand, as the result of the determination, when the intensity Ube of the reflected light in the remaining object appearance schedule zone Sbe is more than or equal to the object threshold Uc (FIG. 4, S113YES), in the case, the possibility that the player interrupts the ball existence zone Sb with the golf club E and swings. Therefore, the second object appearance determining part 303 determines that the object E appeared at the remaining object appearance schedule zone Sbe.

Here, in order to accurately detect whether or not the object E appearing in the remaining object appearance schedule zone Sbe is a thing for launching the ball B, the following processing may be performed. Namely, when the object E appears in the remaining object appearance schedule zone Sbe, the second object appearance determining part 303 determines whether or not the second appearance time Δt2 from the passing of the object to the disappearance of the object in the ball existence zone Sb is less than the threshold time tc (250 usec).

The determining method is not particularly limited. For example, as shown in FIG. 8B, when the second object appearance determining part 303 determines that the intensity Ube of the reflected light in the remaining object appearance schedule zone Sbe is more than or equal to the object threshold Uc, uses the second appearance point of time t3, based on counting the passing time from the disappearance point of time t2, and calculates the second appearance time Δt2 subtracting the disappearance point of time t2 from the second appearance point of time t3 (FIG. 4, S114). Here, the counting the passing time from the disappearance point of time t2 is stopped. And, the second object appearance determining part 303 determines whether or not the second appearance time Δt2 is less than the threshold time tc (FIG. 4, S115). Here, by using the threshold time tc, it is possible to determine whether or not the object E interrupts at equal or greater speed even in the front object appearance schedule zone Sbf and the end object appearance schedule zone Sbe.

As the result of the determination, when the second appearance time Δt2 is more than or equal to the threshold time tc (FIG. 4, S115NO), in the case, it means that although the movement of the object E before hitting the ball B is fast, the player suddenly decelerated the object E when hitting the ball B for some reason, so the possibility that the ball B is not launched precisely is high. Therefore, the second object appearance determining part 303 newly acquires the intensity Ub of the reflected light in the ball existence zone Sb, and determines whether or not the intensity Ub of the reflected light is more than or equal to the determining value Ub0 (FIG. 4, S116).

As the result of the determination, when the intensity Ub of the reflected light is less than the determining value Ub0 (FIG. 4, S116NO), in the case, it means that the player shifted the position of the golf ball B with the golf club E. Therefore, the second object appearance determining part 303 goes to S102, and restarts all processing.

On the other hand, as the result of the determination, when the intensity Ub of the reflected light is more than or equal to the determining value Ub0 (FIG. 4, S116YES), in the case, it means that the player swings with the golf club E and the golf ball B still remains. Therefore, the second object appearance determining part 303 goes to S108, and restarts from the determination of the appearing object.

By the way, in S115, as the result of the determination, when the second appearance time Δt2 is less than the threshold time tc (FIG. 4, S115YES), in the case, it means that the movement of the object E before and after hitting and the possibility that the object E launches the ball B is high. Therefore, the second object appearance determining part 303 determines that the object E appeared in order to launch the ball B.

Finally, a ball disappearance determining part 304 determines whether or not the ball B in the ball existence zone Sb disappeared, based on the intensity Ub the reflected light in the ball existence zone Sb. The determining method is not particularly limited. For example, the ball disappearance determining part 304 newly acquires the intensity Ub the reflected light in the ball existence zone Sb, and determines whether or not the intensity Ub the reflected light in the ball existing zone Sb is equal to the determining value Ub0 (FIG. 4, S117).

As the result of the determination, when the intensity Ub the reflected light in the ball existence zone Sb is equal to the determining value Ub0 (FIG. 4, S117YES), in the case, as shown in FIG. 9A, it means that the player moves the golf club E at fast and swings, and the golf ball B still remains. Therefore, the ball disappearance determining part 304 goes to S108, and restarts from the determination of the appearing object.

On the other hand, as the result of the determination, when the intensity Ub the reflected light in the ball existing zone Sb is not equal to the determining value Ub0 (FIG. 4, S117NO), in the case, as shown in FIG. 9B, it means that the player moves the golf club E at fast and launched the golf ball B. Therefore, the ball disappearance determining part 304 determines that the ball B in the ball existing zone Sb disappeared, and the launched ball detecting apparatus 1 goes to the final fifth state.

In the fifth state, a ball launch detecting part 305 detects that the ball B was launched by the object E, based on the disappearance of the ball B in the ball existence zone Sb (FIG. 4, S118), and transmits a trigger signal, the trigger signal indicating that the ball B was launched by the object E, to an external apparatus of the launched ball detecting apparatus 1. In this way, it is possible to accurately detect the launch of the ball B.

Here, the trigger signal is used like below. The launched ball detecting apparatus 1 comprises a camera 306, a camera image capturing part 307 capturing (photographing) the detecting zone Z with the camera 306. The camera image capturing part 307 periodically repeats to take plural camera images within a predetermined period from a specific timing (when turn-on, etc.) and to erase the plural camera images. For example, the capturing interval within a predetermined capturing period such as 10 sec is select between 0.03 sec and 2.00 sec, and the camera image capturing part 307 continuously takes plural camera images at the selected capturing interval in the capturing period. The plural camera images are acquired in the respective capturing period. For example, if the image holding period when the plural camera images are held is 30 sec, the plural camera images are linked with the capturing period in the respective capturing periods of 10 sec. In addition, the plural camera images temporarily held (stored) in the capturing period are appropriately erased corresponding to the relationship with the memory capacity. For example, if the image holding period is 30 sec, when the next capturing period of 10 sec passed, the plural camera images linked with the oldest capturing period in the image holding period are erased, and the plural camera images linked with the next capturing period are newly held. In such a situation, when the camera image capturing part 307 receives the trigger signal from the ball launch detecting part 305, the camera image capturing part 307 acquires the plural camera images in the before and after reception point of time when receiving the trigger signal from the ball launch detecting part 305. In this way, it is possible to acquire the plural camera images at the before and after moment when the ball B is launched, and to accurately calculate the launch speed of the ball, the launch elevational angle, the launch horizontal angle, etc., at the moment when the ball B is launched. In addition, it is possible to accurately measure the calculated flight parameters of the ball B.

Here, the camera images at the moment when the golf ball B is launched by the golf club E are displayed with the launched ball detecting apparatus 1 fabricated based on FIG. 1-FIG. 3 as an Example. As shown in FIG. 10A, the player places the launched ball detecting apparatus 1 equipped with a high-resolution and high-speed camera in a golf practice area, puts the golf ball B in the just beside of the launched ball detecting apparatus 1, and hits the golf ball B with the golf club E. As shown in FIG. 10B, when the golf ball B is launched and disappears, as shown in FIG. 10C, the launched ball detecting apparatus 1 acquires the camera image at the moment when the golf ball B is launched by the golf club E, based on the trigger signal. And, as shown in FIG. 10D, the launched ball detecting apparatus 1 acquires the camera image after the golf ball B was launched by the golf club E. In this way, it is understood that the launched ball detecting apparatus 1 according to the present invention can detect the launch of the ball accurately.

In addition, in the embodiment of the present invention, the launched ball detecting apparatus 1 is explained corresponding to the golf ball B, it is unnecessary to limit this case, the present invention may be widely applied as an apparatus for detecting the launched ball in ball game that the stopped ball B is launched such as baseball, tennis, rugby, ice hockey, gate ball and the like.

In the embodiment of the present invention, the infrared zone IRZ is formed as the detecting zone Z using the slits 11, it is unnecessary to limit this case, the detecting zone Z where the intensity of the reflected light including the infrared light is detected may be applied.

In the embodiment of the present invention, the launched ball detecting apparatus 1 is configured to include each unit, but it may be configured that a program for materializing the units is stored in a storage medium and the storage medium is provided. In such configuration, the program is read on the apparatus materializes the respective units. In this case, the program read from the storage medium provides the effect of the present invention. Additionally, the steps executed by the respective units may be stored in the hard disk.

INDUSTRIAL APPLICABILITY

As described above, the launched ball detecting apparatus and the launched ball detecting method are useful as an apparatus and a method for detecting the detecting the launched ball in every ball game that the stopped ball is launched. It is effective as the launched ball detecting apparatus and the launched ball detecting method that can detect the launch of the ball accurately.

REFERENCE SIGNS LIST

1 Launched ball detecting apparatus
301 Ball existence determining part
302 First object appearance determining part
303 Second object appearance determining part
304 Ball disappearance determining part
305 Ball launch detecting part
306 Camera
307 Camera image capturing part

The invention claimed is:

1. A launched ball detecting apparatus comprising:
a ball existence determining part determining a specific infrared zone where the stopped ball exists as a ball existing zone in plural infrared zones, the infrared zone irradiated with the infrared light, based on the intensity of the reflected light in the respective plural infrared zones being adjacent one another;
a first object appearance determining part determining the front and end infrared zones being adjacent the ball existing zone as front and end object appearance schedule zones when the ball existing zone is determined, and determining whether or not the object for launching the ball appeared in either one of the front and end object appearance schedule zones, based on the intensity of the reflected light in the respective front and end object appearance schedule zones;
a second object appearance determining part determining whether or not the object appeared in the remaining object appearance schedule zone other than the object appearance zone where the object appeared, based on the intensity of the reflected light in the remaining object appearance schedule zone when the object appeared in either one of the front and end object appearance schedule zones;
a ball disappearance determining part determining whether or not the ball in the ball existing zone disappeared, based on the reflected light in the ball existing zone when the object appeared in the remaining object appearance schedule zone; and
a ball launch detecting part detecting that the ball was launched by the object when the ball in the ball existing zone disappeared, and transmitting a trigger signal.

2. The launched ball detecting apparatus according to claim 1, further comprising:
a camera capturing the plural infrared zones; and
a camera image capturing part periodically repeating to take plural camera images within a predetermined period and to erase the plural camera images, and acquiring the plural camera images in the before and after reception point of time when receiving the trigger signal from the ball launch detecting part.

3. The launched ball detecting apparatus according to claim 1, wherein
the first object appearance determining part determines whether or not the first appearance time from the appearance of the object to the disappearance of the object in the object appearance zone where the object appeared is less than a threshold time, when the object appears in either one of the front and end object appearance schedule zones, and
the second object appearance determining part determines whether or not the object appeared in the remaining object appearance schedule zone, when the first appearance time is less than the threshold time.

4. The launched ball detecting apparatus according to claim 1, wherein
the second object appearance determining part determines whether or not the second appearance time from the passing of the object to the disappearance of the object in the ball existence zone is less than a threshold time, when the object appears in the remaining object appearance schedule zone; and
the ball disappearance determining part determines whether or not the ball in the ball existing zone disappeared, when the second appearance time is less than the threshold time.

5. A launched ball detecting method comprising:
a ball existence determining step for determining a specific infrared zone where the stopped ball exists as a ball existing zone in plural infrared zones, the infrared zone irradiated with the infrared light, based on the intensity of the reflected light in the respective plural infrared zones being adjacent one another;
a first object appearance determining step for determining the front and end infrared zones being adjacent the ball existing zone as front and end object appearance schedule zones when the ball existing zone is determined, and determining whether or not the object for launching the ball appeared in either one of the front and end object appearance schedule zones, based on the intensity of the reflected light in the respective front and end object appearance schedule zones;

a second object appearance determining step for determining whether or not the object appeared in the remaining object appearance schedule zone other than the object appearance zone where the object appeared, based on the intensity of the reflected light in the remaining object appearance schedule zone when the object appeared in either one of the front and end object appearance schedule zones;

a ball disappearance determining step for determining whether or not the ball in the ball existing zone disappeared, based on the reflected light in the ball existing zone when the object appeared in the remaining object appearance schedule zone; and a ball launch detecting step for detecting that the ball was launched by the object when the ball in the ball existing zone disappeared, and transmitting a trigger signal.

\* \* \* \* \*